(12) United States Patent
Kim

(10) Patent No.: US 10,571,364 B2
(45) Date of Patent: Feb. 25, 2020

(54) BOLT AND NUT FASTENING TEST APPARATUS

(71) Applicants: HYUNDAI MOTOR COMPANY, Seoul (KR); KIA MOTORS CORPORATION, Seoul (KR)

(72) Inventor: Hyung Soo Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 209 days.

(21) Appl. No.: 15/783,815

(22) Filed: Oct. 13, 2017

(65) Prior Publication Data

US 2019/0017898 A1    Jan. 17, 2019

(30) Foreign Application Priority Data

Jul. 13, 2017 (KR) .................. 10-2017-0088875

(51) Int. Cl.
*G01M 13/00* (2019.01)

(52) U.S. Cl.
CPC .................. *G01M 13/00* (2013.01)

(58) Field of Classification Search
CPC .... G01L 5/24; G01N 2291/2691; G01N 3/08; G01M 99/007; G01M 13/00
USPC ...................................................... 73/118.01
See application file for complete search history.

(56) References Cited

U.S. PATENT DOCUMENTS

| | | | | |
|---|---|---|---|---|
| 2,586,708 A * | 2/1952 | Petit | ...................... | G01L 5/0042 346/138 |
| 4,719,804 A * | 1/1988 | Maruyama | ............... | G01N 3/00 73/761 |
| 4,866,990 A * | 9/1989 | Peterson | ............... | G01L 5/0042 73/761 |
| 4,944,188 A * | 7/1990 | Dial | ...................... | G01L 5/0033 411/14 |
| 6,810,747 B2 * | 11/2004 | Engler | ...................... | G01L 5/24 73/761 |
| 7,260,998 B2 * | 8/2007 | Madden | ................ | G01L 5/0028 73/761 |
| 8,096,194 B2 * | 1/2012 | Chiapuzzi | ................. | G01L 5/24 73/761 |
| 8,291,772 B2 * | 10/2012 | Lopez, III | ........... | G01M 99/007 73/845 |
| 8,418,569 B2 * | 4/2013 | Everitt | ................... | G01L 5/0042 73/862.21 |
| 8,511,181 B2 * | 8/2013 | Duffin | ................... | G01L 3/1457 73/862.22 |
| 8,578,793 B2 * | 11/2013 | Carlin | ................... | G01L 25/003 73/862.21 |
| 9,696,224 B1 * | 7/2017 | Tsai | .......................... | G01L 3/00 |

(Continued)

*Primary Examiner* — Freddie Kirkland, III
(74) *Attorney, Agent, or Firm* — Knobbe Martens Olson & Bear LLP

(57) ABSTRACT

Disclosed is a bolt and nut fastening test apparatus. The bolt and nut fastening test apparatus includes an angle adjusting plate mounted on a supporting block so as to be adjustable in angle, a driving motor mounted on a side surface of the angle adjusting plate so as to be able to ascend and descend and having a driving shaft arranged to face downward, a bolt socket mounted on the driving shaft of the driving motor and to which a head of a bolt is coupled, and a nut socket disposed below the bolt socket and supporting a nut fastened to the bolt in a rotation limited state.

14 Claims, 10 Drawing Sheets

(56) References Cited

U.S. PATENT DOCUMENTS 10,260,995 B2 * 4/2019 Que ................... G01M 99/008
2003/0145657 A1 * 8/2003 Engler ..................... G01L 5/24
73/761

* cited by examiner

BOLT AND NUT FASTENING TEST APPARATUS

CROSS-REFERENCE TO RELATED APPLICATION(S)

This application claims the benefit of Korean Patent Application No. 10-2017-0088875, filed on Jul. 13, 2017 in the Korean Intellectual Property Office, the disclosure of which is incorporated herein by reference.

BACKGROUND

1. Field

The present disclosure relates to a bolt and nut fastening test apparatus for testing the fastening of a bolt and a nut.

2. Description of the Related Art

Bolts and nuts are fastening means used to fasten or attach objects, and are widely used in various fields such as automobiles, machinery, industrial facilities, and buildings.

A bolt and a nut can be securely fastened when they are fastened with their central axes aligned with each other. However, since the environment where a bolt and a nut are fastened is various at a work site, an operator may fasten the bolt and the nut in a state where the center axes of the bolt and the nut are inclined or misaligned. If the fastening is attempted with the center axes of a bolt and a nut inclined or misaligned, the thread of the bolt and the thread of the nut are misaligned and it may become impossible to fasten. In extreme cases, the threads may break and become unusable.

The productivity of various industrial sites is deteriorated due to unstable fastening of bolts and nuts. Therefore, it is preferred to select bolts and nuts that do not cause inaccurate fastening in industrial sites employing bolts and nuts by sufficiently testing whether the bolts and nuts are inaccurately fastened according to fastening angles of the bolts and nuts.

The discussions and disclosure of this section are to provide background of the invention. Applicant notes that this section may contain information available before this application. However, by providing this section, Applicant does not admit that any information contained in this section constitutes prior art.

SUMMARY

One aspect of the present disclosure provides a bolt and nut fastening test apparatus capable of simulating and testing the fastening of bolts and nuts similarly to the actual situation.

Another aspect of the present disclosure provides a bolt and nut fastening test apparatus capable of repeatedly performing a fastening test of a bolt and a nut at a set fastening angle.

Additional aspects of the invention will be set forth in part in the description which follows and, in part, will be obvious from the description, or may be learned by practice of the invention.

In accordance with an aspect of the present disclosure, a bolt and nut fastening test apparatus may include an angle adjusting plate mounted on a supporting block so as to be adjustable in angle, a driving motor mounted on a side surface of the angle adjusting plate so as to be able to ascend and descend and having a driving shaft arranged to face downward, a bolt socket mounted on the driving shaft of the driving motor and to which a head of a bolt is coupled, and a nut socket disposed below the bolt socket and supporting a nut fastened to the bolt in a rotation limited state.

The bolt and nut fastening test apparatus may further include a motor bracket slidably coupled to at least one rail mounted in a vertical direction on a side surface of the angle adjusting plate with the driving motor mounted.

The bolt and nut fastening test apparatus may further include a weight assembly mounted on a side surface of the angle adjusting plate opposite to the driving motor so as to be able to ascend and descend, at least one pulley mounted on an upper portion of the angle adjusting plate, and a connecting rope having opposite ends connected to the motor bracket and the weight assembly, respectively, in a state of being hung on the pulley.

The weight assembly may include a weight bracket slidably coupled to the rail mounted in a vertical direction at a side surface of the angle adjusting plate, at least one weight supporting shaft installed on the weight bracket, and a plurality of weights selectively stacked on the weight supporting shaft to regulate a load.

The bolt and nut fastening test apparatus may further include a guide bar installed on a side surface of the angle adjusting plate and guiding the lifting and lowering of the motor bracket, a drop limiting ring installed at an outer surface of the guide bar so as to be adjustable in height, and a tightening member for tightening the drop limiting ring to limit the movement of the drop limiting ring.

The bolt and nut fastening test apparatus may further include a lowering damper connected to the motor bracket to control a lowering speed of the motor bracket.

The bolt and nut fastening test apparatus may further include a supporting shaft rotatably coupled to an upper portion of the supporting block in a state of being fixed to a lower portion of the angle adjusting plate, and a restraining device capable of restraining the supporting shaft to fix the angle adjusting plate.

The restraining device may include a securing member coupled to a side surface of a shaft supporting member and having an incision groove formed on one side thereof, and a tightening bolt fastened to the securing member to tighten or release the supporting shaft.

The bolt and nut fastening test apparatus may further include a restoring device for vertically restoring the angle adjusting plate tilted when the restraint of the restraining device is released.

The restoring device may include an extension cylinder, one end of which is rotatably connected to a rotation direction side end of the angle adjusting plate and the other end of which is rotatably supported to a fixed structure.

The restoring device may include a torsion spring installed at the supporting shaft.

The restoring device may include a pulling device for pulling up the angle adjusting plate at an upper portion of the angle adjusting plate.

The bolt and nut fastening test apparatus may further include an inclined support surface provided at a lower side of the angle adjusting plate, an angle adjusting block installed to be laterally movable on the supporting block so as to be close to or spaced from the inclined support surface, a feed screw installed at an upper side of the supporting block to move the angle adjusting block by rotation, and an indicating portion provided at the supporting block to identify a position of the angle adjusting block.

The bolt and nut fastening test apparatus may further include an angle measuring instrument installed at the angle adjusting plate to indicate an inclination of the angle adjusting plate.

The bolt and nut fastening test apparatus may further include a socket supporting member supporting the nut socket at a lower portion of the nut socket and having a space into which the bolt enters.

The bolt socket and the nut socket may be replaceably mounted, respectively.

A bolt and nut fastening test apparatus according to the embodiment of the present disclosure can simulate and test the fastening of a bolt and a nut similarly to the actual situation since a descending speed and fastening angle of the bolt can be adjusted during the test process as desired by a user.

Further, a bolt and nut fastening test apparatus according to the embodiment of the present disclosure can repeatedly perform bolt and nut fastening tests at a set fastening angle since the angle adjusting plate can be accurately tilted and fixed at a set angle.

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings are not intended to limit the scope of the present disclosure in any way, and the size of components may be exaggerated for clarity of illustration.

Figure 1:
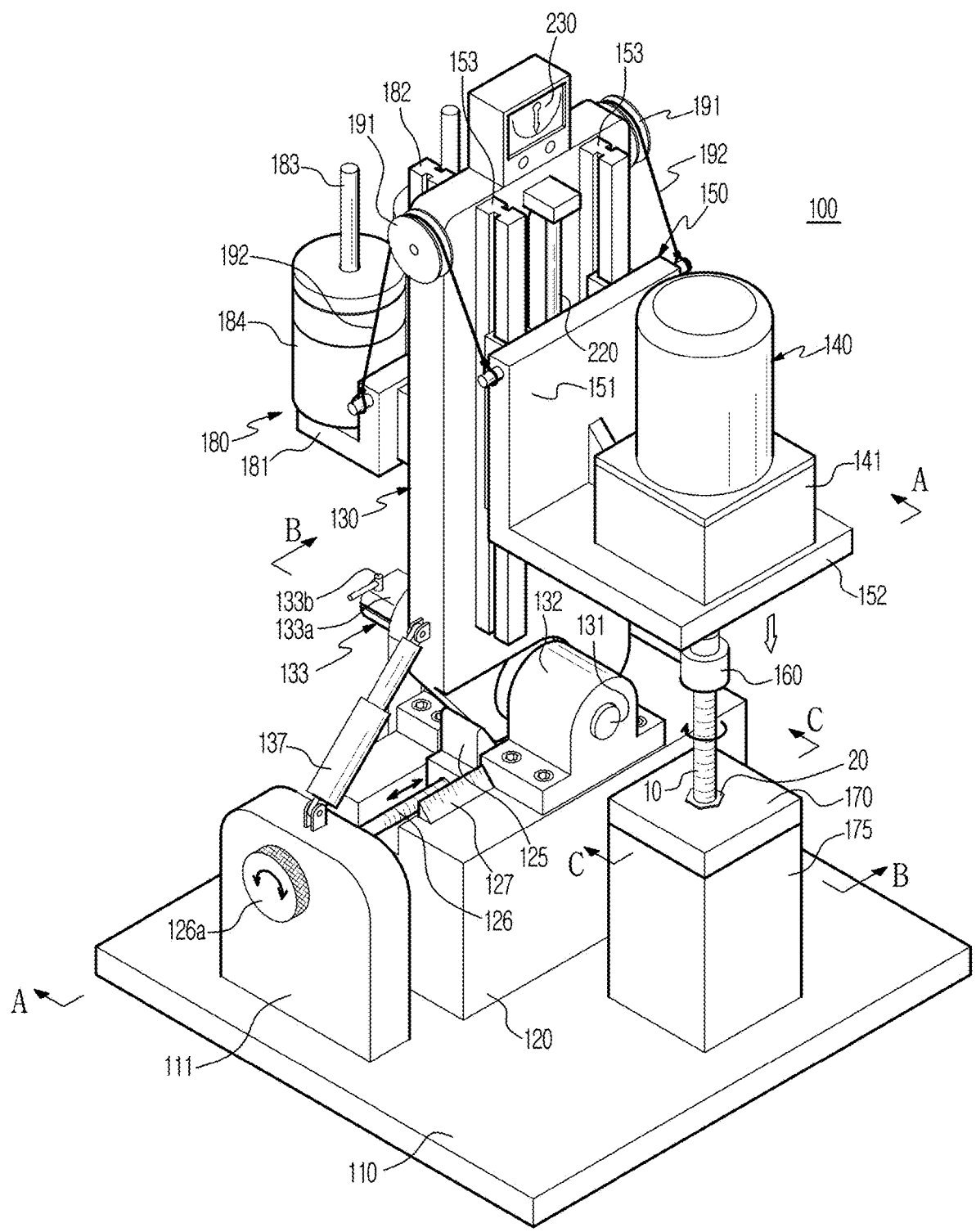
FIG. 1 is a perspective view of a bolt and nut fastening test apparatus according to an embodiment of the present disclosure in one direction.
Figure 2:
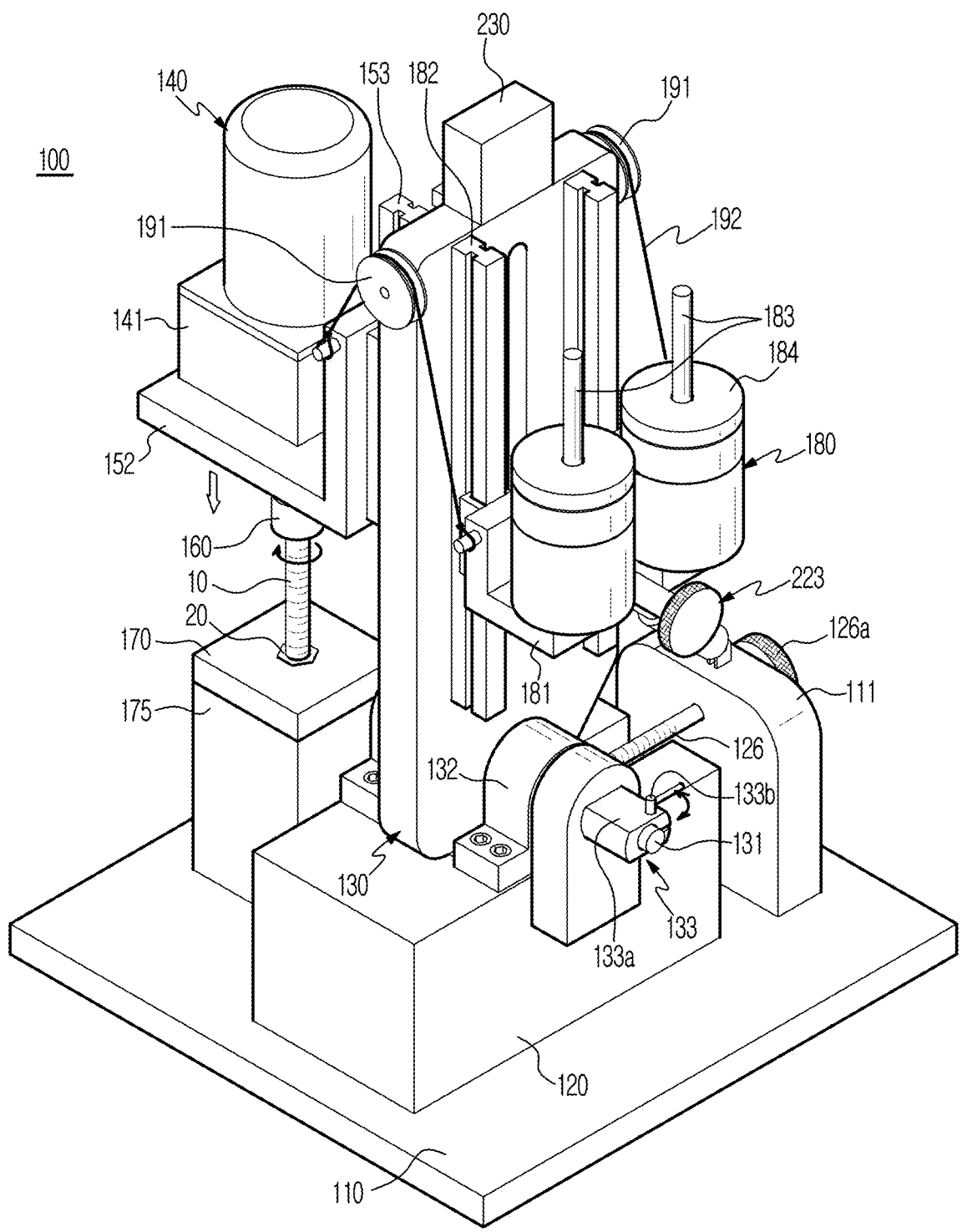
FIG. 2 is a perspective view of a bolt and nut fastening test apparatus according to an embodiment of the present disclosure in the other direction.
Figure 3:
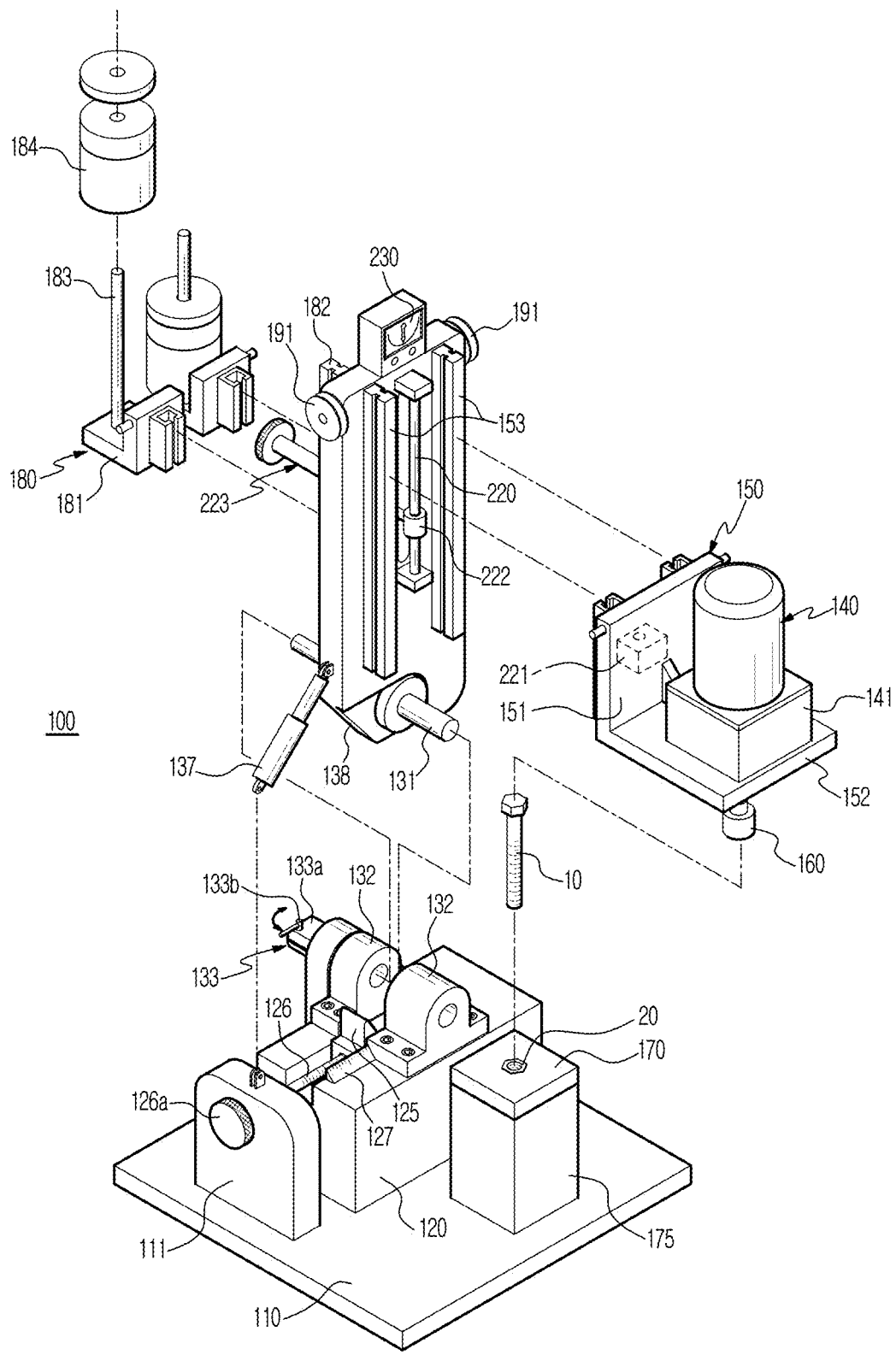
FIG. 3 is an exploded perspective view of a bolt and nut fastening test apparatus according to an embodiment of the present disclosure.

FIG. 1 is a perspective view of a bolt and nut fastening test apparatus according to an embodiment of the present disclosure in one direction, FIG. 2 is a perspective view in the other direction, and FIG. 3 is an exploded perspective view.

Referring to FIGS. 1 to 3, a bolt and nut fastening test apparatus 100 according to an embodiment of the present disclosure a base member 110, a supporting block 120 fixed on the base member 110, an angle adjusting plate 130 mounted on the supporting block 120 so as to be adjustable in angle, a driving motor 140 mounted on one side of the angle adjusting plate 130 so as to be able to ascend and descend, a bolt socket 160 mounted on a driving shaft 142 of the driving motor 140 and to which a head of a bolt 10 is coupled, and a nut socket 170 disposed below the bolt socket 160 and supporting in a rotation limited state a nut 20 fastened to the bolt 10. In an alternative embodiment, the nut socket is attached to the driving shaft and the bolt socket is attached to the socket supporting member such that, when testing, the nut moves down and rotates while the bolt is fixed without movement.

As illustrated in FIG. 3, the angle adjusting plate 130 may be provided in the form of a rectangular flat plate having a long length in a vertical direction, and a lower portion of the angle adjusting plate 130 may be rotatably installed at an upper portion of the supporting block 120 by a supporting shaft 131 and a plurality of shaft supporting members 132.

The supporting shaft 131 is fixed to a lower portion of the angle adjusting plate 130 in such a manner as to penetrate the angle adjusting plate 130 in a horizontal direction. Therefore, the angle adjusting plate 130 and the supporting shaft 131 rotate together. Opposite ends of the supporting shaft 131 are rotatably supported by a plurality of shaft supporting members 132 coupled to an upper portion of the supporting block 120, respectively. Therefore, the angle adjusting plate 130 may be supported in a vertical state on the supporting block 120 as in the example of FIG. 4, or may be supported in a tilted state by being rotated in one direction as in the example of FIG. 5.

As illustrated in FIGS. 2 and 3, a restraining device 133 which can fix the angle adjusting plate 130 by restraining the supporting shaft 131 is installed at one of the shaft supporting members 132 that support the supporting shaft 131. The restraining device 133 may include a securing member 133a coupled to a side surface of the shaft supporting member 132 and having an incision groove formed on one side thereof, and a tightening bolt 133b fastened to the securing member 133a to tighten or loosen the supporting shaft 131. The restraining device 133 is capable of fixing the angle adjusting plate 130 in a vertical or tilted state by releasing the tightening bolt 133b to rotate the angle adjusting plate 130 or tightening the tightening bolt 133b.

As illustrated in FIGS. 1 and 3, the driving motor 140 may be mounted on a motor bracket 150 that is installed at one side surface of the angle adjusting plate 130 so as to be able to ascend and descend. The motor bracket 150 may include a sliding engagement portion 151 slidably coupled to a plurality of rails 153 installed in a vertical direction at a side surface of the angle adjusting plate 130, and a motor mounting portion 152 bent and extended from a lower end of the sliding engagement portion 151. The driving motor 140 is mounted on the motor mounting portion 152 in a state in which the driving shaft 142 is disposed so as to face downward. The driving motor 140 may include a reduction gear unit 141.

Figure 6:
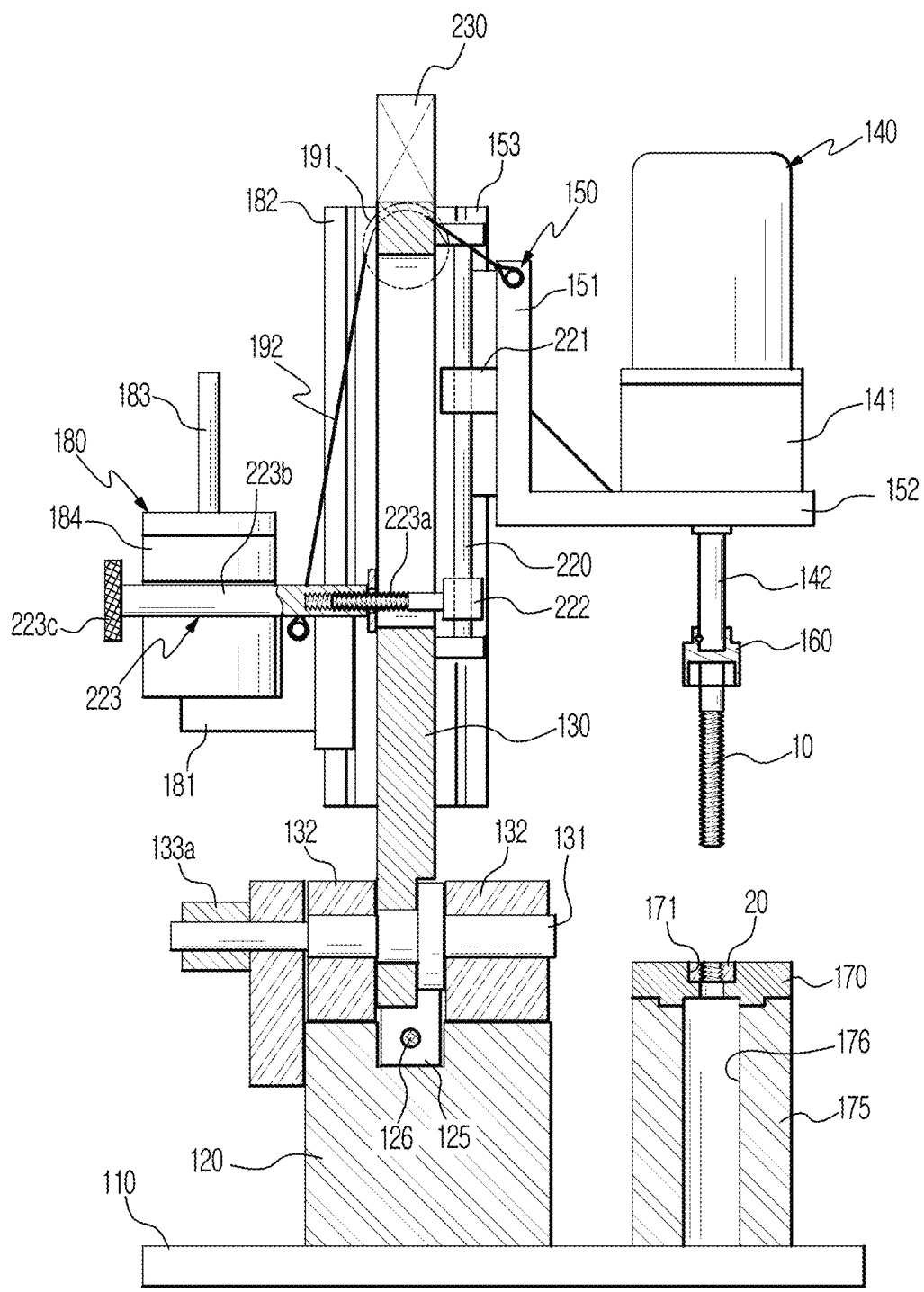
FIG. 6 is a cross-sectional view taken along line B-B in FIG. 1, showing a state in which a drive motor is lifted.

As illustrated in FIGS. 3 and 6, the bolt socket 160 is detachably installed to a lower end of the driving shaft 142 of the driving motor 140. The head of the bolt 10 is coupled to the bolt socket 160. The bolt socket 160 has the property of a permanent magnet so that the head of the bolt 10 can be kept attached after being coupled. The bolt socket 160 may be replaced by a different size when the bolt 10 to be tested is changed.

The nut socket 170, which is disposed below the bolt socket 160, may support in a rotation limited state the nut 20 fastened to the bolt 10. In embodiments, the nut socket 170 has a nut groove 171 for receiving the nut 20 in the rotation limited state. The nut socket 170 may be detachably mounted on a socket supporting member 175 in the form of a rectangular block. Accordingly, when the size of the nut 20 to be tested is changed, the nut socket 170 may be replaced with another one having the nut groove 171 of different size. The socket supporting member 175 has a space 176 in an inner side thereof so that the bolt 10 fastened to the nut 20 can enter downward.

Figure 7:
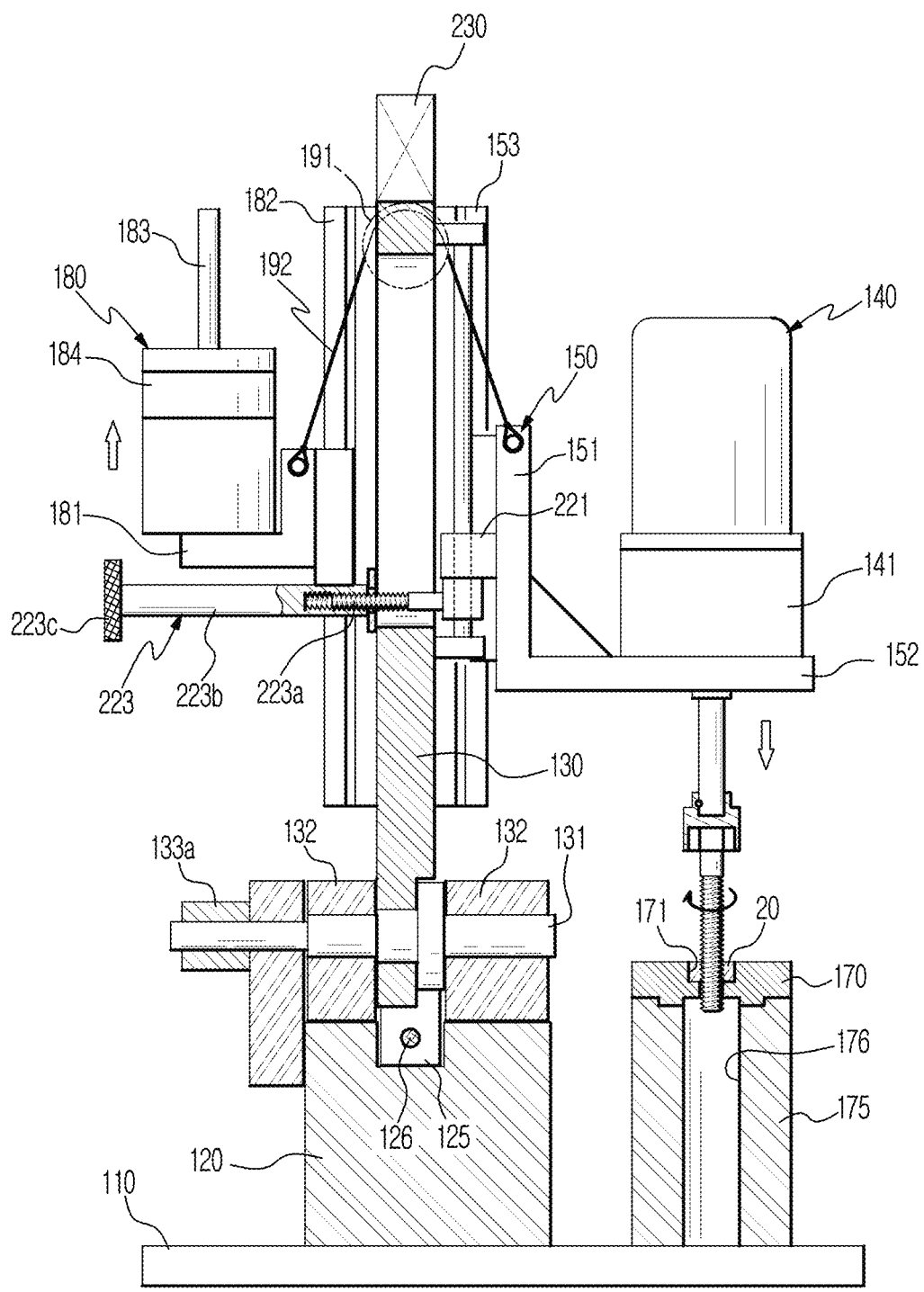
FIG. 7 is a cross-sectional view taken along line B-B in FIG. 1, showing a state in which a drive motor is lowered.

In the bolt and nut fastening test apparatus 100 as above, as illustrated in FIG. 6, a state in which the driving motor 140 is raised, the bolt 10 to be tested is mounted on the bolt socket 160 and the nut 20 to be tested is mounted on the nut socket 170. Next, as illustrated in FIG. 7, the driving motor 140 is operated to rotate the bolt 10 in a fastening direction while the driving motor 140 is lowered, thereby testing the fastening of the bolt 10 and the nut 20.

As illustrated in FIGS. 2, 3 and 6, the bolt and nut fastening test apparatus 100 according to the embodiment may include a weight assembly 180 mounted on the opposite side of the angle adjusting plate 130 facing the driving motor 140 so as to be able to ascend and descend, pulleys 191 mounted on opposite ends of an upper portion of the angle adjusting plate 130, respectively, and a connecting rope 192 having opposite ends connected to the motor bracket 150 and the weight assembly 180 in a state of being hung on each pulley 191.

The weight assembly 180 may include a weight bracket 181 of an L shape slidably coupled to the plurality of rails 182 that are mounted in a vertical direction at a side surface of the angle adjusting plate 130, weight supporting shafts 183 installed at the opposite ends of the weight bracket 181, respectively, and a plurality of weights selectively stacked on the weight supporting shafts 183 to regulate a load.

The weight assembly 180 is connected to the motor bracket 150 by the connecting ropes 192 and thus rises when the driving motor 140 is lowered. The weight assembly 180 may regulate a descending speed of the driving motor 140 by adjusting a load of the driving motor 140 and the motor bracket 150 by a plurality of weights 184 in consideration of the weight of the driving motor 140 and the motor bracket 150.

Figure 10:
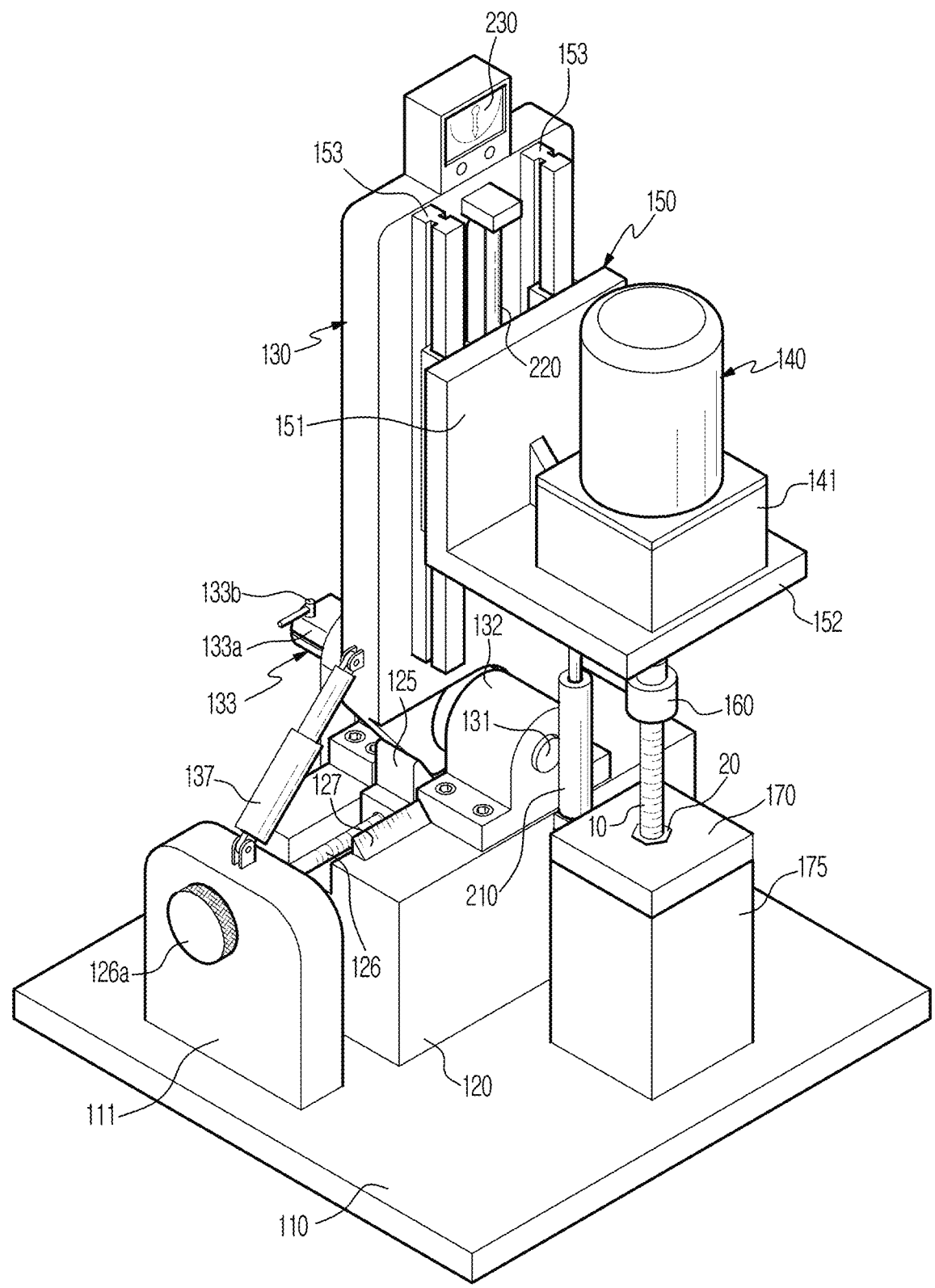
FIG. 10 illustrates a modification of the descending speed control means of a bolt and nut fastening test apparatus according to the embodiment of the present disclosure.

On the other hand, the descending speed control means of the driving motor 140 is not limited to the above-described example, and may be variously changed. In embodiments, the descending speed control means may employ a gas cylinder type lowering damper 210 instead of the weighting assembly 180 as illustrated in FIG. 10. One end of the lowering damper 210 may be rotatably connected to the motor bracket 150 and the other end may be rotatably connected to the supporting block 120. The lowering damper 210 may control a descending speed of the motor bracket 150 by applying a resistance when the motor bracket 150 descends.

Referring again to FIGS. 3, 6 and 7, the bolt and nut fastening test apparatus 100 includes a guide bar 220 installed at a side surface of the angle adjusting plate 130 facing the motor bracket 150 to guide lifting and lowering of the motor bracket 150, a guide member 221 that moves up and down along the guide bar 220 in a state of being coupled to the motor bracket 150, a drop limiting ring 222 provided on an outer surface of the guide bar 220 at the lower side of the guide member 221 so as to be adjustable in height, and a tightening member 223 for tightening the drop limiting ring 222 to limit the movement of the drop limiting ring 222.

As illustrated in FIG. 6, the tightening member 223 may include a tightening bolt 223a extending from the drop limiting ring 222 through a slot 135 of the angle adjusting plate 130 to the opposite side, a tightening shaft 223b fastened to the tightening bolt 223a on the opposite side of the angle adjusting plate 130, and a handle 223c coupled to an end of the tightening shaft 223b. The tightening member 223 may release the tightening shaft 223b to adjust the height of the drop limiting ring 222 and secure the tightening shaft 223b by tightening the tightening shaft 223b. As in an example illustrated in FIG. 7, the drop limiting ring 222 may limit a lowering position of the driving motor 140 in consideration of the length of the bolt 10 by limiting lowering of the guide member 221 coupled to the motor bracket 150.

Figure 4:
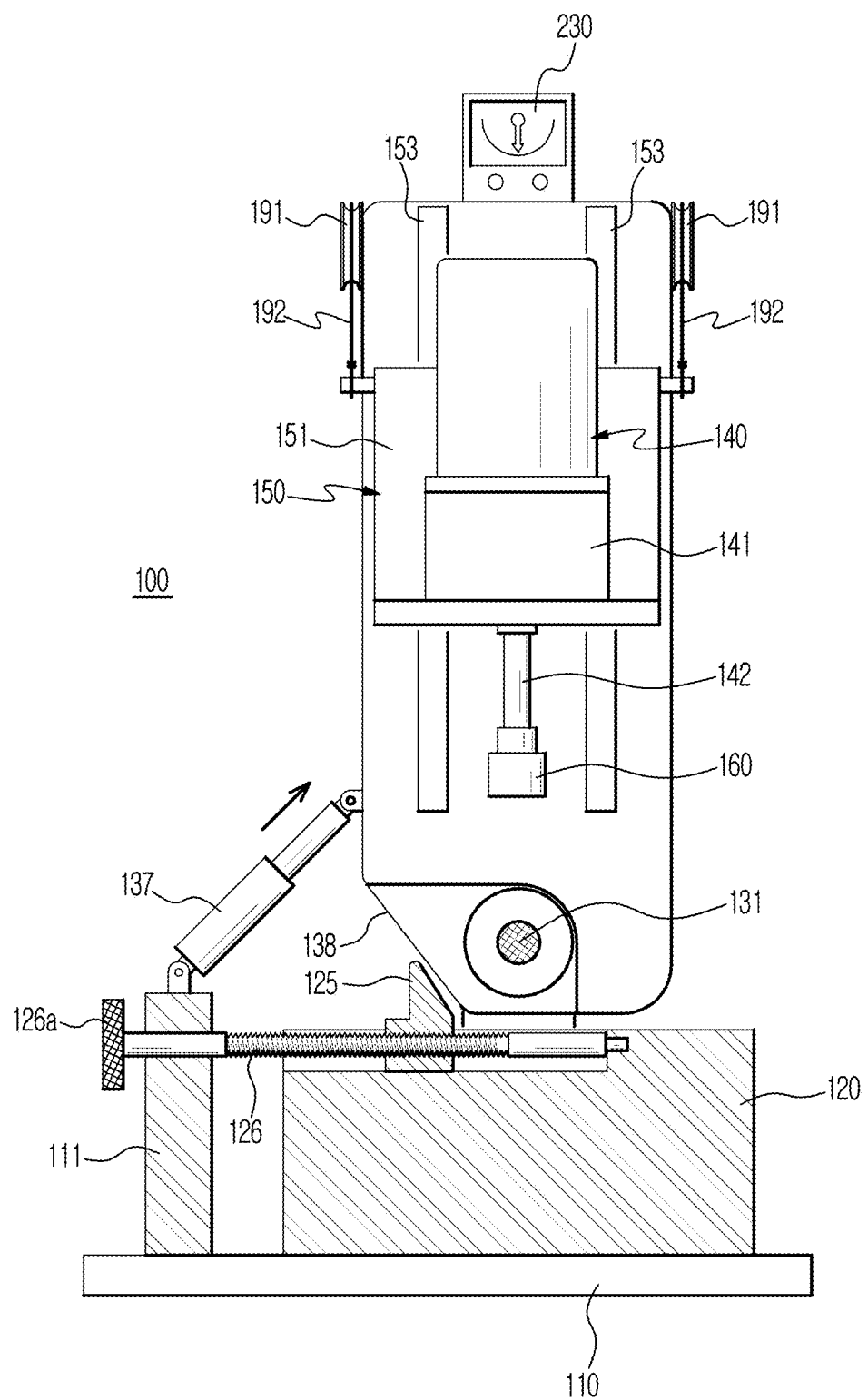
FIG. 4 is a cross-sectional view taken along line A-A in FIG. 1, showing a state in which an angle adjusting plate is erected.
Figure 5:
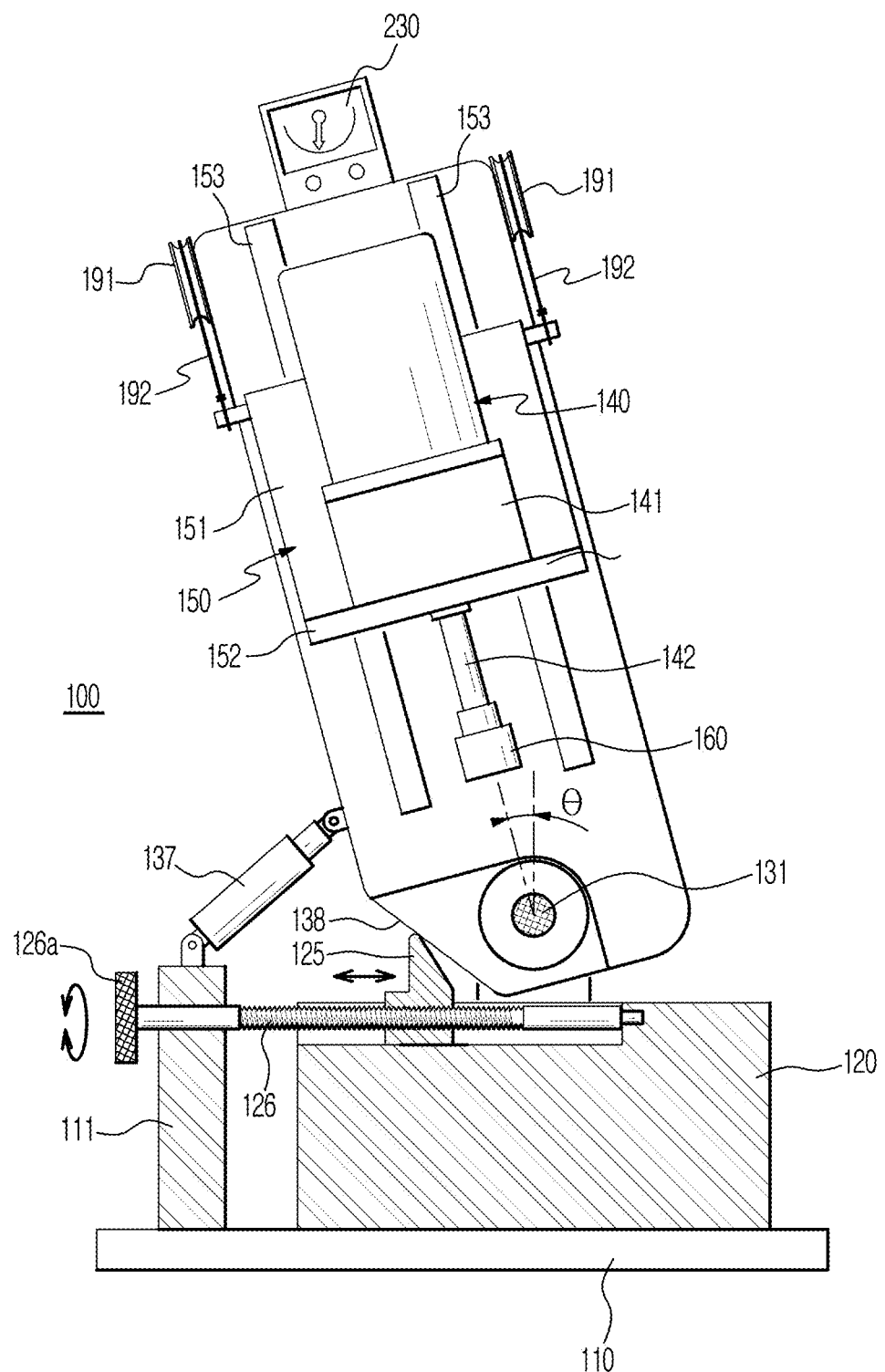
FIG. 5 is a cross-sectional view taken along line A-A in FIG. 1, showing a state in which an angle adjusting plate is tilted at a set angle.

Referring to FIGS. 3 to 5, at the angle adjusting plate 130 may be installed a restoring device 137 for vertically restoring the angle adjusting plate 130 tilted when the restraint of the restraining device 133 is released. The restoring device 137 may include an extension cylinder, one end of which is rotatably connected to a rotation direction side end of the angle adjusting plate 130 and the other end of which is rotatably supported to a fixed structure 111 fixed to the base member 110.

When the restraining device 133 is released from the restricting state, the extension cylinder may slowly rotate the angle regulating plate 130 from the state of FIG. 5 to the state of FIG. 6 through extending so as to restore to the initial state, so that the driving shaft 142 of the driving motor 140 is held perpendicular to the base member 110.

Although the present embodiment illustrates an extension cylinder as an example of the restoring device 137, the restoring device 137 is not limited thereto. The restoring device 137 may include a torsion spring installed at the supporting shaft 131 and a pulling device for pulling up the angle adjusting plate 130 at an upper portion of the angle adjusting plate 130.

As illustrated in FIGS. 3 to 5, the bolt and nut fastening test apparatus 100 according to the embodiment may include an inclined support surface 138 provided at a lower side of the angle adjusting plate 130, an angle adjusting block 125 installed to be laterally movable on the supporting block 120 so as to be close to or spaced from the inclined support surface 138, a feed screw 126 installed at an upper side of the supporting block 120 to move the angle adjusting block 125 by rotation, and an indicating portion 127 provided at the supporting block 120 to identify a position of the angle adjusting block 125.

The feed screw 126 may have one end rotatably supported on the supporting block 120 and the other end rotatably supported on the fixed structure 111 spaced apart from the supporting block 120, and may include a knob 126a provided at one end for rotating operation. The angle adjusting block 125 is slidably supported at an upper portion of the supporting block 120 in a state of being coupled to the feed screw 126.

As illustrated in FIG. 5, the angle adjusting block 125 can be close to or away from the inclined support surface 138 by moving in a lateral direction by the rotating operation of the feed screw 126. Accordingly, when the user adjusts the inclination of the angle adjusting plate 130, the inclination of the angle adjusting plate 130 may be accurately adjusted by tilting the angle adjusting plate 130 after appropriately moving the angle adjusting block 125. The position of the angle adjusting block 125 may be accurately adjusted by viewing the scale of the indicating portion 127.

An angle measuring instrument 230 may be installed at an upper portion of the angle adjusting plate 130 to indicate the inclination of the angle adjusting plate 130. The user may confirm through the angle measuring instrument 230 whether the inclination of the angle adjusting plate 130 is correctly set.

Hereinafter, a method of performing a fastening test of the bolt 10 and the nut 20 using the bolt and nut fastening test apparatus 100 according to the present embodiment will be described.

In order to test the fastening of the bolt 10 and the nut 20, as illustrated in FIG. 6, the bolt 10 for testing is mounted on the bolt socket 160 in a state in which the driving motor 140 is lifted, and the nut 20 for testing is mounted on the nut socket 170. In this state, the driving motor 140 is operated to rotate the bolt 10 at a normal fastening speed, and the driving motor 140 is lowered through the free fall as in an example of FIG. 7, thereby testing the fastening of the bolt 10 and the nut 20.

Figure 8:
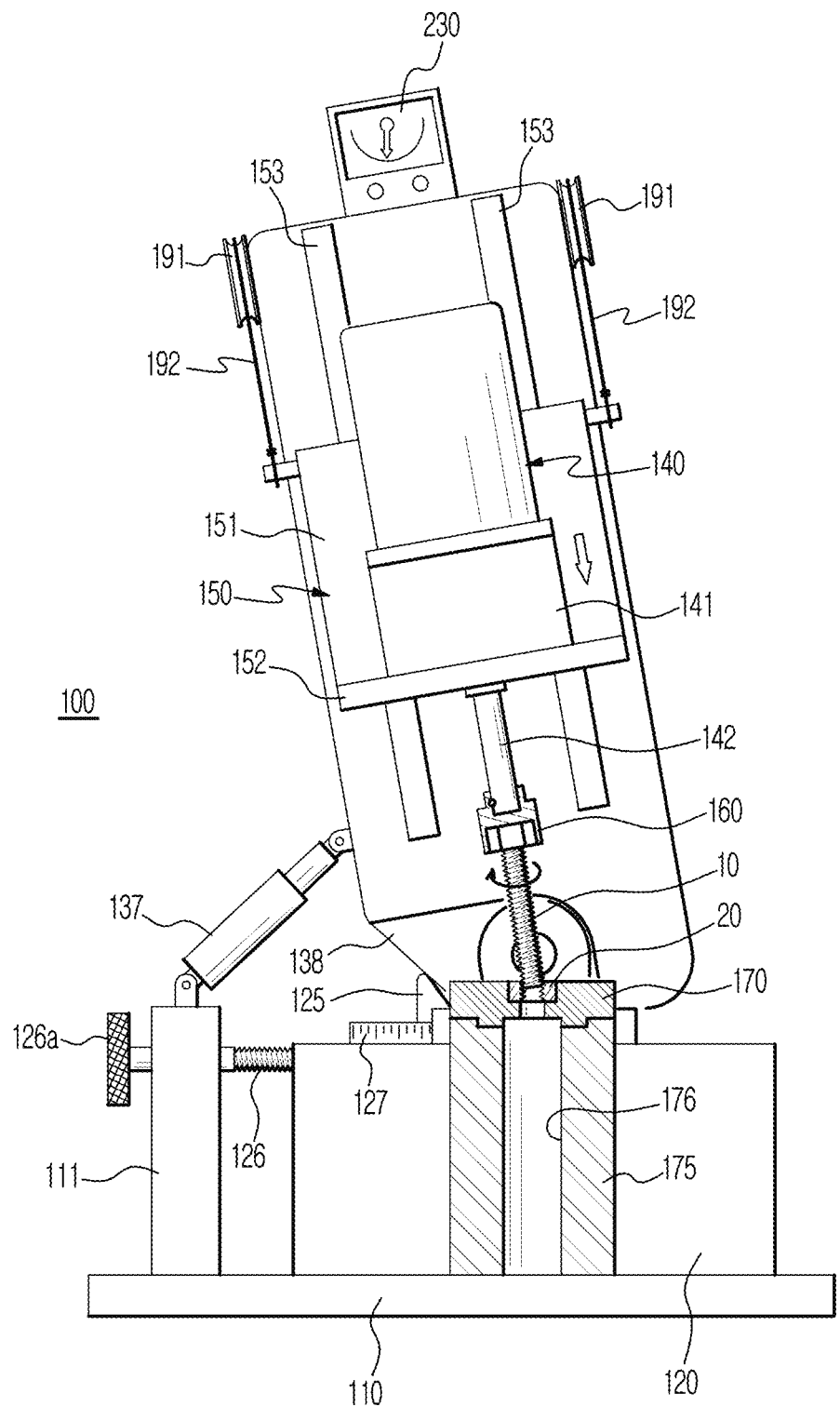
FIG. 8 is a cross-sectional view taken along line C-C in FIG. 1, showing an example in which a bolt and a nut are fastened in a state in which the central axes of the bolt and nut are inclined.
Figure 9:
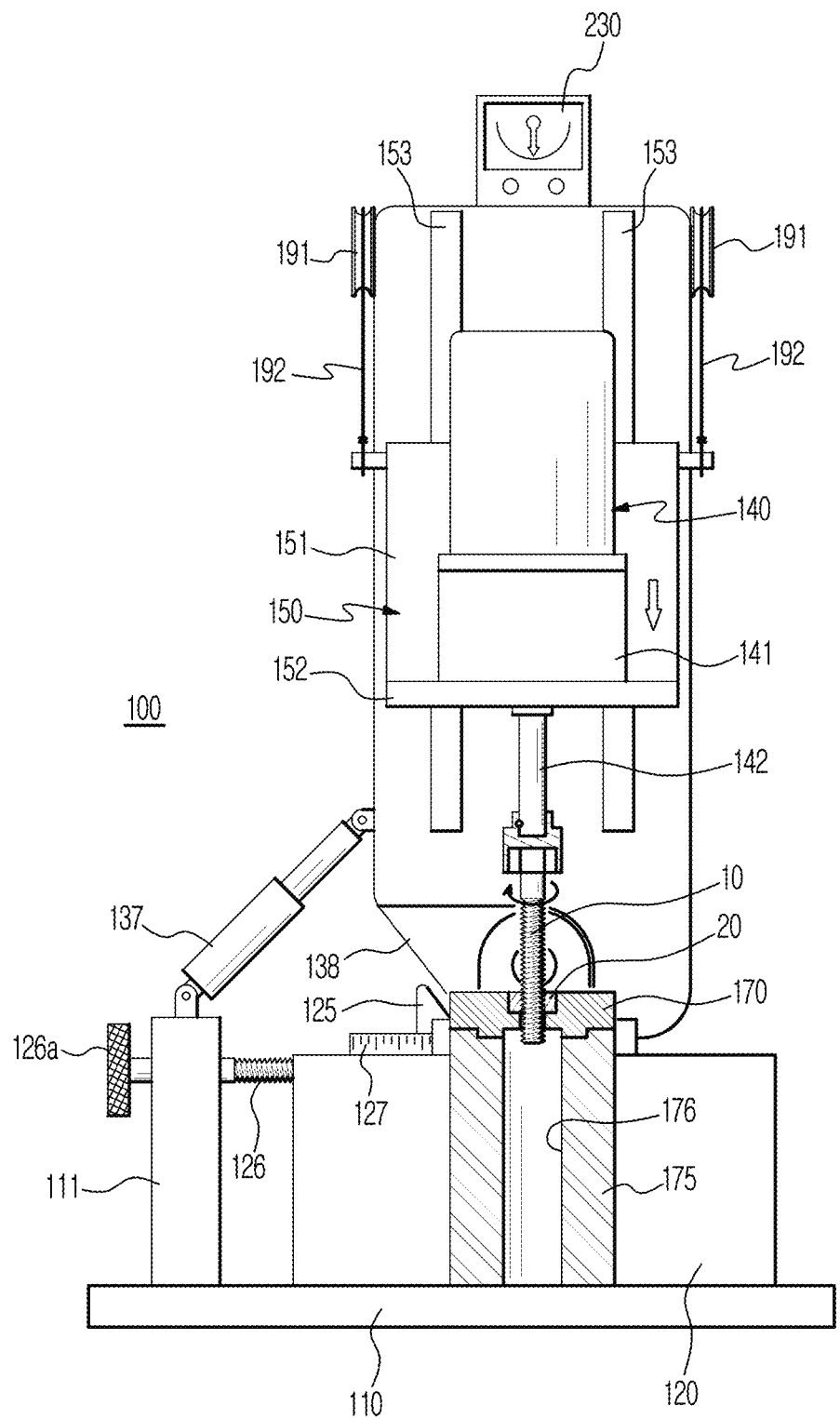
FIG. 9 is a cross-sectional view taken along line C-C in FIG. 1, showing an example in which a bolt and a nut are fastened in a state in which the central axes of the bolt and nut are aligned.

The fastening test may be performed in a state where the angle adjusting plate 130 is tilted at a set test angle as illustrated in FIG. 8, or in a state where the angle adjusting plate 130 is vertically erected as illustrated in FIG. 9.

As in the example of FIG. 8, when the fastening test is performed in a state where the angle adjusting plate 130 is tilted, the fastening state can be confirmed while changing the tilt angle of the angle adjusting plate 130. In embodiments, whether the bolt 10 is rotated without being tightened at the set angle and whether or not the bolt 10 and the nut 20 are caught by the unstable fastening can be confirmed. Also, the test results can be used as data for improving the fastening of the bolt 10 and the nut 20. For example, the test results can be used as data for improving the shape of the end of the bolt 10, and improving the shape of the thread of the bolt 10 or the nut 20.

Further, when the phenomenon that the bolt 10 is rotated without being fastened (idling phenomenon) occurs in the test illustrated in FIG. 8, the bolt and nut fastening test apparatus 100 can test whether the bolt 10 and the nut 20 are fastened by attempting to fasten in a state where the angle adjusting plate 130 is vertically erected as illustrated in FIG. 9.

As a result of the test, it can be determined that the bolt 10 and the nut 20 are satisfactory when the bolt 10 which is not fastened and run idle in a test shown in FIG. 8 is securely fastened in a test shown in FIG. 9.

As is apparent from the above, the bolt and nut fastening test apparatus 100 according to the embodiment of the present disclosure can simulate and test the fastening of the bolt 10 and the nut similarly to the actual situation since a descending speed and fastening angle of the bolt 10 can be adjusted during the test process as desired by a user.

Further, the bolt and nut fastening test apparatus 100 according to the embodiment of the present disclosure can repeatedly perform fastening tests of the bolt 10 and the nut 20 at a set fastening angle since the angle adjusting plate 130 can be accurately tilted and fixed at a set angle using the angle adjusting block 125.

In embodiments, when testing engageability of the bolt and the nut using the bolt and nut engaging tester 100 discussed above, the tester 100 moves the angle adjusting plate 130 and sets a first test angle (for example, 0°). At the first test angle, the bolt fixed to the bolt socket 160 rotates in a rotational direction and moves down toward the nut fixed to the nut socket 170 for testing engageability of the bolt and the nut at the first angle. After testing, the bolt rotates in the opposite direction, and the bolt and the nut are disengaged. Subsequently, without removing the bolt and the nut from the sockets 160 and 170 or without replacing the bolt and the nut with another bolt and another nut, the tester 100 moves the angle adjusting plate 130 and sets a second test angle (for example, 0.1°) that is different from the first angle. At the second test angle, the bolt rotates again in the rotational direction and moves down toward the nut for testing engageability of the bolt and the nut at the second angle. In one embodiment, each test angle is defined by an angle between the central axis of the bolt with respect to the linear movement direction of the bolt socket. In some embodiments, the test angle may gradually increase until the bolt and the nut fail to engage or fasten. In other embodiments, the test angle may gradually decrease until the bolt and the nut are successfully engaged.

In embodiments, the tester or testing apparatus discussed above may further include a controller with one or more processors for controlling the movements of parts in the tester, for example, the angle adjusting plate 130 and the motor 140.

What is claimed is:

1. A bolt and nut fastening test apparatus comprising:
   an angle adjusting plate mounted on a supporting block so as to be adjustable in angle;
   a driving motor mounted on a side surface of the angle adjusting plate so as to be able to ascend and descend and having a driving shaft arranged to face downward;
   a bolt socket mounted on the driving shaft of the driving motor and to which a head of a bolt is coupled;
   a nut socket disposed below the bolt socket and supporting a nut fastened to the bolt in a rotation limited state;
   a motor bracket slidably coupled to at least one rail mounted in a vertical direction on a side surface of the angle adjusting plate with the driving motor mounted
   a weight assembly mounted on a side surface of the angle adjusting plate opposite to the driving motor so as to be able to ascend and descend;
   at least one pulley mounted on an upper portion of the angle adjusting plate; and
   a connecting rope having opposite ends connected to the motor bracket and the weight assembly, respectively, in a state of being hung on the pulley.

2. The bolt and nut fastening test apparatus according to claim 1, wherein the weight assembly comprises:
   a weight bracket slidably coupled to the rail mounted in a vertical direction at a side surface of the angle adjusting plate;
   at least one weight supporting shaft installed on the weight bracket; and
   a plurality of weights selectively stacked on the weight supporting shaft to regulate a load.

3. The bolt and nut fastening test apparatus according to claim 1, further comprising:
   a guide bar installed on a side surface of the angle adjusting plate and guiding the lifting and lowering of the motor bracket;
   a drop limiting ring installed on an outer surface of the guide bar so as to be adjustable in height; and
   a tightening member for tightening the drop limiting ring to limit the movement of the drop limiting ring.

4. The bolt and nut fastening test apparatus according to claim 1, further comprising a lowering damper connected to the motor bracket to control a lowering speed of the motor bracket.

5. The bolt and nut fastening test apparatus according to claim 1, further comprising an angle measuring instrument installed at the angle adjusting plate to indicate an inclination of the angle adjusting plate.

6. The bolt and nut fastening test apparatus according to claim 1, further comprising a socket supporting member supporting the nut socket at a lower portion of the nut socket and having a space into which the bolt enters.

7. The bolt and nut fastening test apparatus according to claim 6, wherein the bolt socket and the nut socket are replaceably mounted, respectively.

8. A bolt and nut fastening test apparatus comprising:
an angle adjusting plate mounted on a supporting block so as to be adjustable in angle;
a driving motor mounted on a side surface of the angle adjusting plate so as to be able to ascend and descend and having a driving shaft arranged to face downward;
a bolt socket mounted on the driving shaft of the driving motor and to which a head of a bolt is coupled;
a nut socket disposed below the bolt socket and supporting a nut fastened to the bolt in a rotation limited state;
a supporting shaft rotatably coupled to an upper portion of the supporting block in a state of being fixed to a lower portion of the angle adjusting plate: and
a restraining device capable of restraining the supporting shaft to fix the angle adjusting plate.

9. The bolt and nut fastening test apparatus according to claim 8, wherein the restraining device comprises a securing member coupled to a side surface of a shaft supporting member and having an incision groove formed on one side thereof, and a tightening bolt fastened to the securing member to tighten or release the supporting shaft.

10. The bolt and nut fastening test apparatus according to claim 8, further comprising a restoring device for vertically restoring the angle adjusting plate tilted when the restraint of the restraining device is released.

11. The bolt and nut fastening test apparatus according to claim 10, wherein the restoring device comprises an extension cylinder, one end of which is rotatably connected to a rotation direction side end of the angle adjusting plate and the other end of which is rotatably supported to a fixed structure.

12. The bolt and nut fastening test apparatus according to claim 10, wherein the restoring device comprises a torsion spring installed at the supporting shaft.

13. The bolt and nut fastening test apparatus according to claim 10, wherein the restoring device comprises a pulling device for pulling up the angle adjusting plate at an upper portion of the angle adjusting plate.

14. A bolt and nut fastening test apparatus comprising:
an angle adjusting plate mounted on a supporting block so as to be adjustable in angle;
a driving motor mounted on a side surface of the angle adjusting plate so as to be able to ascend and descend and having a driving shaft arranged to face downward;
a bolt socket mounted on the driving shaft of the driving motor and to which a head of a bolt is coupled;
a nut socket disposed below the bolt socket and supporting a nut fastened to the bolt in a rotation limited state;
an inclined support surface provided at a lower side of the angle adjusting plate;
an angle adjusting block installed to be laterally movable on the supporting block so as to be close to or spaced from the inclined support surface;
a feed screw installed at an upper side of the supporting block to move the angle adjusting block by rotation; and
an indicating portion provided at the supporting block to identify a position of the angle adjusting block.

\* \* \* \* \*